US011378956B2

United States Patent
Zhang et al.

(10) Patent No.: US 11,378,956 B2
(45) Date of Patent: Jul. 5, 2022

(54) PERCEPTION AND PLANNING COLLABORATION FRAMEWORK FOR AUTONOMOUS DRIVING

(71) Applicant: Baidu USA LLC, Sunnyvale, CA (US)

(72) Inventors: Liangliang Zhang, San Jose, CA (US); Dong Li, Sunnyvale, CA (US); Jiangtao Hu, Sunnyvale, CA (US); Jiaming Tao, Sunnyvale, CA (US); Yifei Jiang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 65 days.

(21) Appl. No.: 15/944,289

(22) Filed: Apr. 3, 2018

(65) Prior Publication Data

US 2019/0302768 A1    Oct. 3, 2019

(51) Int. Cl.
  *G05D 1/00* (2006.01)
  *G05D 1/02* (2020.01)
  *B60W 50/14* (2020.01)

(52) U.S. Cl.
  CPC ........... *G05D 1/0088* (2013.01); *B60W 50/14* (2013.01); *G05D 1/0212* (2013.01); *G05D 1/0268* (2013.01); *G05D 2201/0212* (2013.01)

(58) Field of Classification Search
  CPC .. G05D 1/0291; G05D 1/0088; G05D 1/0212; G05D 1/0268; G05D 2201/0212; G05D 2201/0213; G05D 1/0214; G05D 1/0221; G05D 1/0223; G08G 1/202; G06N 5/04; G06Q 10/06311; B60W 50/14; B60W 2554/402; B60W 2552/10;

(Continued)

(56) References Cited

U.S. PATENT DOCUMENTS 5,911,771 A * 6/1999 Reichart ................. F16H 59/60
                                                          477/97
8,060,307 B2 * 11/2011 Matsuno ............. B60T 8/17551
                                                          701/301

(Continued)

FOREIGN PATENT DOCUMENTS

JP    2017-111565 A    6/2017
JP    2018-172052 A    11/2018

*Primary Examiner* — Angelina Shudy
*Assistant Examiner* — Mohamed Abdo Algehaim
(74) *Attorney, Agent, or Firm* — Womble Bond Dickinson (US) LLP

(57) ABSTRACT

A perception module is configured to perceive a driving environment surrounding an autonomous driving vehicle (ADV) based on sensor data, and to generate perception information using various perception models or methods. The perception information describes the perceived driving environment. Based on the perception information, a planning module is configured to plan a trajectory representing a route or a path for a current planning cycle. The ADV is then controlled and driven based on the trajectory. In addition, the planning module determines a critical region (also referred to as a critical area) surrounding the ADV based on the trajectory in view of a current location or position of the ADV. The metadata describing the critical region is transmitted to the perception module via an application programming interface (API) to allow the perception module to generate perception information for a next planning cycle in view of the critical region.

19 Claims, 11 Drawing Sheets

(58) Field of Classification Search
CPC ........... B60W 60/0015; B60W 60/001; B60W 2554/00; B60W 60/0011; B60W 30/18154; B60W 30/18159; B60W 30/10; B60W 30/12; B60W 50/143; B60W 50/146; B60W 60/0027; G01C 21/34; G06V 20/58; G06V 20/56
USPC .......................................................... 701/25
See application file for complete search history.

(56) References Cited

U.S. PATENT DOCUMENTS

| | | | | |
|---|---|---|---|---|
| 10,317,900 | B2* | 6/2019 | Kamhi | B60W 50/14 |
| 10,699,167 | B1* | 6/2020 | Dowdall | G06K 9/6292 |
| 2006/0111819 | A1* | 5/2006 | Servera Serapio | B60R 1/00 382/104 |
| 2013/0218433 | A1* | 8/2013 | Matsuno | B60W 30/09 701/70 |
| 2015/0241226 | A1* | 8/2015 | Engelman | G01C 21/34 701/25 |
| 2015/0300825 | A1* | 10/2015 | Manoliu | B60R 16/023 701/409 |
| 2016/0070265 | A1* | 3/2016 | Liu | G01C 21/00 701/3 |
| 2016/0200317 | A1* | 7/2016 | Danzl | B60W 10/10 701/25 |
| 2016/0221573 | A1* | 8/2016 | Prokhorov | B60W 30/08 |
| 2016/0224849 | A1* | 8/2016 | Sakagami | G06V 20/58 |
| 2017/0008521 | A1* | 1/2017 | Braunstein | G05D 1/0287 |
| 2017/0154529 | A1* | 6/2017 | Zhao | B60W 30/12 |
| 2017/0158193 | A1* | 6/2017 | Lopez | B60W 40/04 |
| 2017/0329329 | A1* | 11/2017 | Kamhi | B60W 50/14 |
| 2018/0101178 | A1* | 4/2018 | Yoon | G05D 1/0253 |
| 2018/0148061 | A1* | 5/2018 | Reckziegel | B60W 50/14 |
| 2018/0164804 | A1* | 6/2018 | Hou | G05D 1/0022 |
| 2018/0164827 | A1* | 6/2018 | Chu | G01C 21/3415 |
| 2018/0188732 | A1* | 7/2018 | Yoo | B60R 1/12 |
| 2018/0190016 | A1* | 7/2018 | Yang | G06T 7/73 |
| 2018/0232947 | A1* | 8/2018 | Nehmadi | G01S 17/89 |
| 2018/0259968 | A1* | 9/2018 | Frazzoli | G08G 1/166 |
| 2018/0275658 | A1* | 9/2018 | Iandola | G05D 1/0088 |
| 2018/0356813 | A1* | 12/2018 | Sun | B25J 9/1697 |
| 2019/0019423 | A1* | 1/2019 | Choi | G08G 5/0078 |
| 2019/0066403 | A1* | 2/2019 | Nagura | H04W 4/46 |
| 2019/0113917 | A1* | 4/2019 | Buch | G06N 3/0454 |
| 2019/0120947 | A1* | 4/2019 | Wheeler | G01S 7/4972 |
| 2019/0132709 | A1* | 5/2019 | Graefe | G08G 1/0112 |
| 2019/0143972 | A1* | 5/2019 | Ishioka | G06K 9/00798 701/70 |
| 2019/0196481 | A1* | 6/2019 | Tay | B60W 30/00 |
| 2019/0204834 | A1* | 7/2019 | Harrison | G01S 13/584 |
| 2019/0227549 | A1* | 7/2019 | Hummelshoj | G05D 1/0088 |
| 2019/0236955 | A1* | 8/2019 | Hu | G05D 1/02 |
| 2019/0332120 | A1* | 10/2019 | Choi | G01C 21/32 |
| 2019/0369616 | A1* | 12/2019 | Ostafew | G05D 1/0212 |
| 2020/0255006 | A1* | 8/2020 | Sasu | B60W 30/0953 |

\* cited by examiner

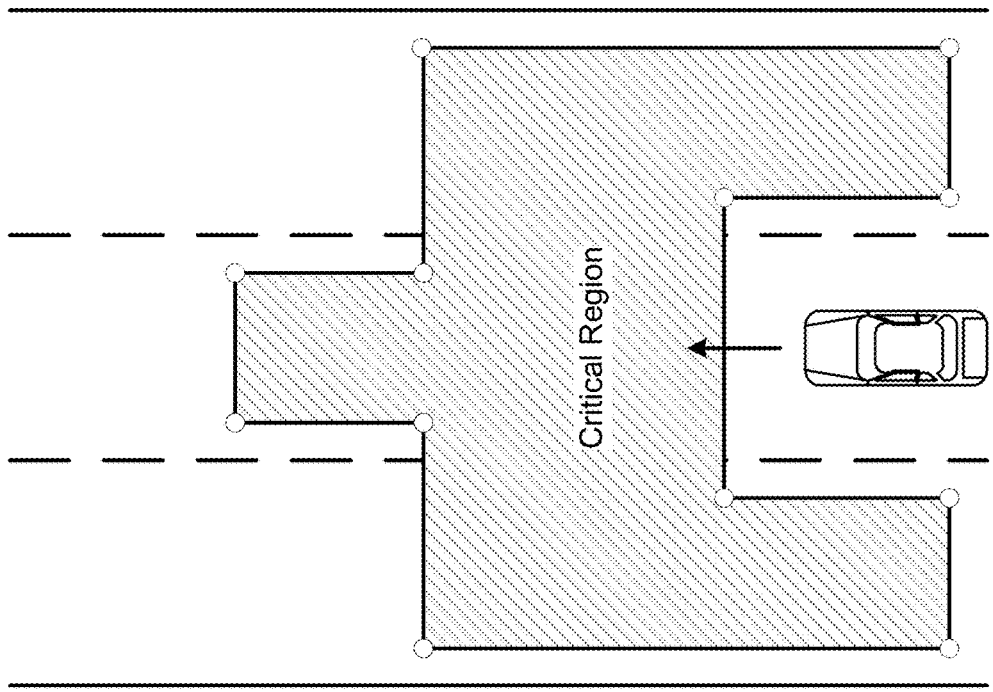

| Trajectory/Critical Region Data Structure 600 |
|---|
| Header 601 |
| Path Length 602 |
| Path Time 603 |
| Trajectory Point Array (x, y, z, θ, t) 604 |
| Critical Region Point Array (e.g., vertexes of polygon) 605 |

FIG. 6

PERCEPTION AND PLANNING COLLABORATION FRAMEWORK FOR AUTONOMOUS DRIVING

TECHNICAL FIELD

Embodiments of the present disclosure relate generally to operating autonomous vehicles. More particularly, embodiments of the disclosure relate to perception and planning of autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Autonomous driving is a complex technology, which involves multiple modules, including a high definition map, localization, perception, prediction, planning, control, etc. In the current technique, an interface is defined for each of the modules and each module performs its own work. Information between modules is unilateral or one directional. However, complex environment and computation limits make single module incapable of calculation everything within a driving or planning cycle. As a result, modules need to exchange information and use computational resources efficiently. There has been a lack of collaboration amongst the autonomous driving modules.

BRIEF DESCRIPTION OF THE DRAWINGS

Embodiments of the disclosure are illustrated by way of example and not limitation in the figures of the accompanying drawings in which like references indicate similar elements.

FIGS. 5A-5C show the critical regions for different driving scenarios according to certain embodiments.

FIG. 6 shows an example of a data structure for storing critical region information according to one embodiment.

DETAILED DESCRIPTION

Figure 1:
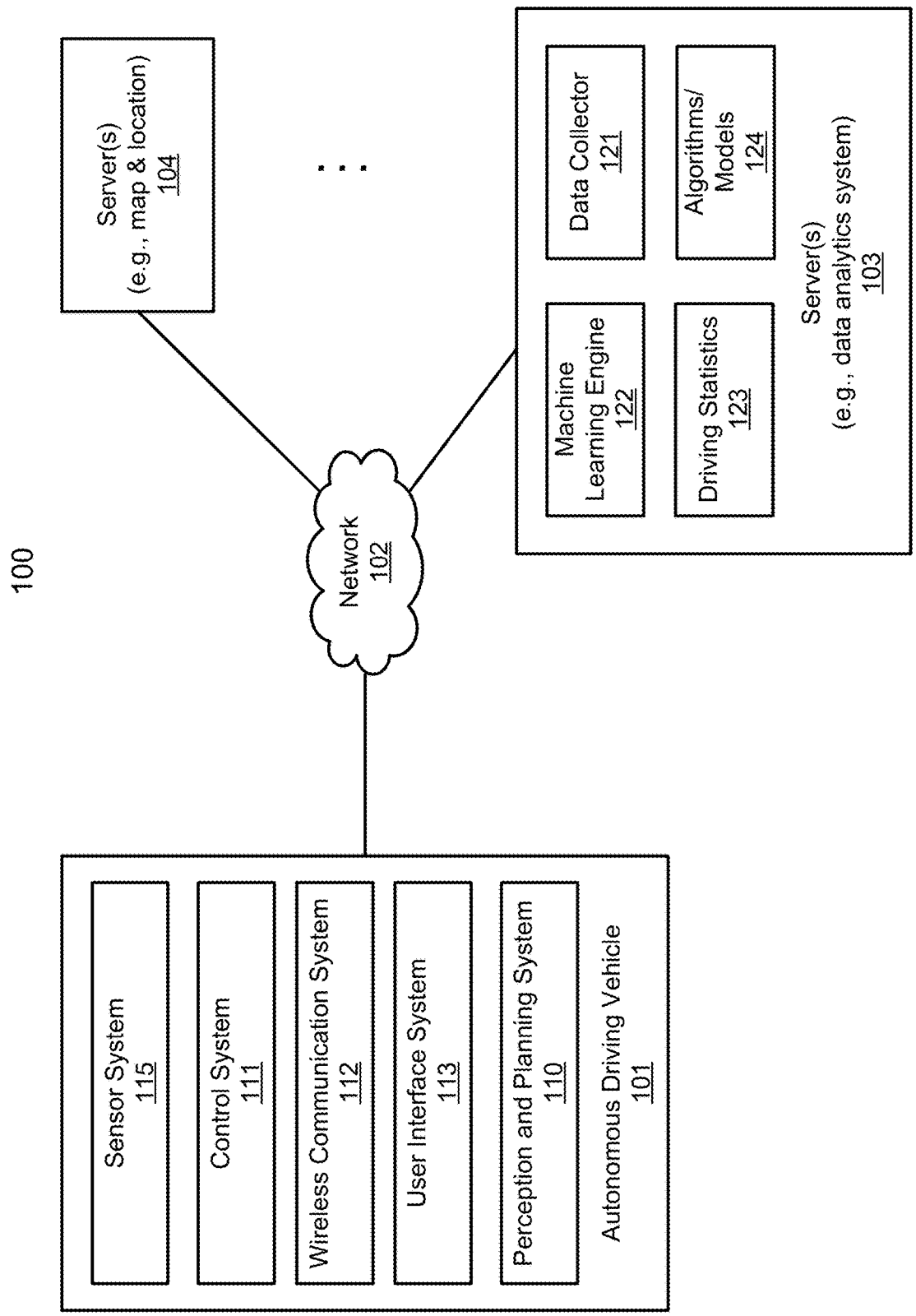
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a perception and planning collaboration framework is utilized to help perception to use their computational resources more efficiently. A perception module is configured to perceive a driving environment surrounding an autonomous driving vehicle (ADV) based on sensor data obtained from a variety of sensors, and to generate perception information using various perception models or methods. The perception information describes the perceived driving environment. Based on the perception information, a planning module is configured to plan a trajectory representing a route or a path for a current planning cycle (also referred to as a driving cycle). The ADV is then controlled and driven based on the trajectory. In addition, the planning module determines a critical region (also referred to as a critical area) surrounding the ADV based on the trajectory in view of a current location or position of the ADV. The metadata describing the critical region is transmitted to the perception module via an application programming interface (API) to allow the perception module to generate perception information for a next planning cycle in view of the critical region.

In one embodiment, a critical region may include one or more areas that the ADV may potentially interfere with other traffic or vice versa during the next planning cycle. In generating perception information for the next cycle, the perception module generates first perception information perceiving the critical region using a first perception model or method. The perception module generates second perception information for the rest of the areas other than the critical region using a second perception model or method. The first perception model may be used to generate perception information with higher precision or resolution based on 3D sensor data, which requires more processing resources and/or longer time to complete. The second perception model may be used to generate perception information with lower precision or resolution based on 2D sensor data, which requires fewer processing resources and/or shorter time to complete.

In one embodiment, in determining a critical region, the planning module determines a driving scenario of the ADV based on the trajectory and the current location of the ADV. A lookup operation is performed in a database based on the driving scenario to obtain metadata describing or definition defining a critical region corresponding to the driving scenario. For example, the metadata may include information specifying a method or rule to define, determine, or calculate a critical region. The database may be a driving scenario to critical region (driving scenario/critical region) mapping table having a number of mapping entries. Each mapping entry maps a particular driving scenario to metadata defining a particular critical region. Based on the metadata, according to one embodiment, a polygon is determined to represent the critical region. The shape of the polygon may be determined based on the metadata while the size of the polygon may be determined based on the trajectory (e.g., current location, speed, heading direction of the ADV), the physical characteristics of the ADV (e.g., physical size or dimension of the ADV), and/or the current perception information (e.g., lane configuration) provided by the perception module. The coordinates of vertexes of the polygon are then determined. The coordinates of vertexes of the polygon are used to represent the critical region. The vertexes of the polygon are then fed back to the perception module to allow the perception module to generate the perception information for the next planning cycle using different perception methods.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
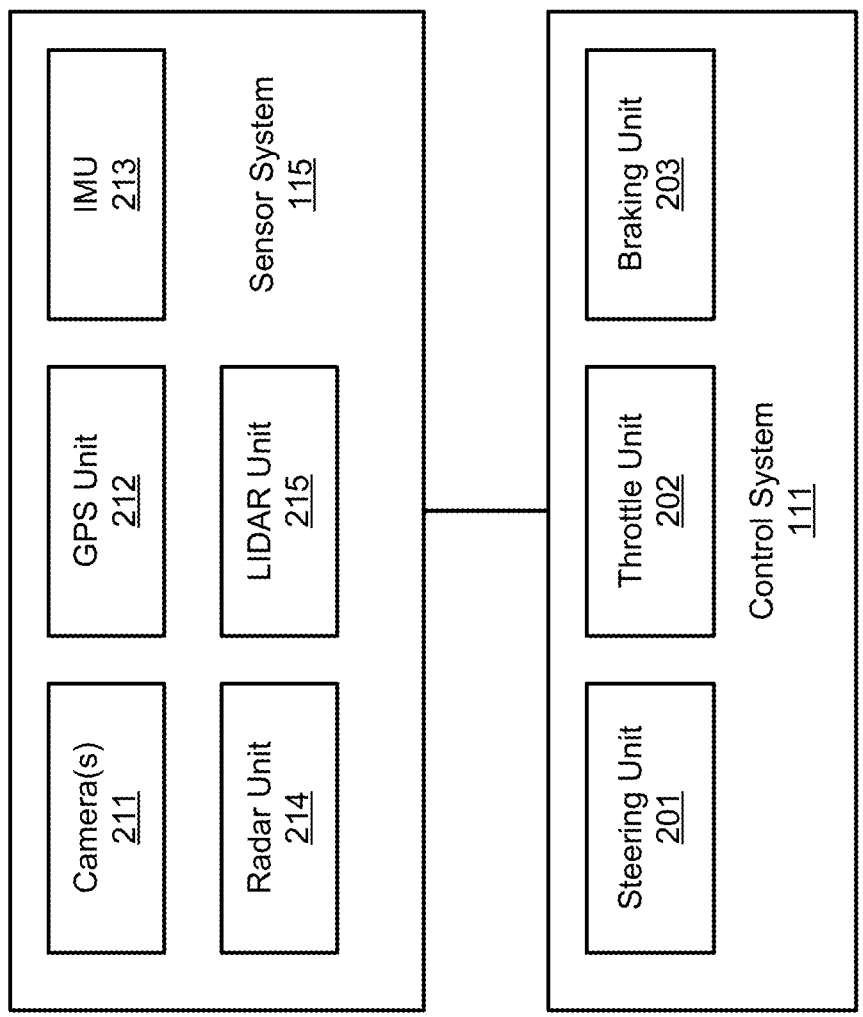
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, data 124 may include information defining a variety of driving scenarios. For each driving scenario, data 124 may further include metadata or algorithms to determine a critical region of an ADV given the current location or position of the ADV. In one embodiment, a driving scenario/critical region mapping table may be generated. The driving scenario/critical region mapping table may then be uploaded into ADVs for determining critical regions at real-time driving.

Figure 3A:
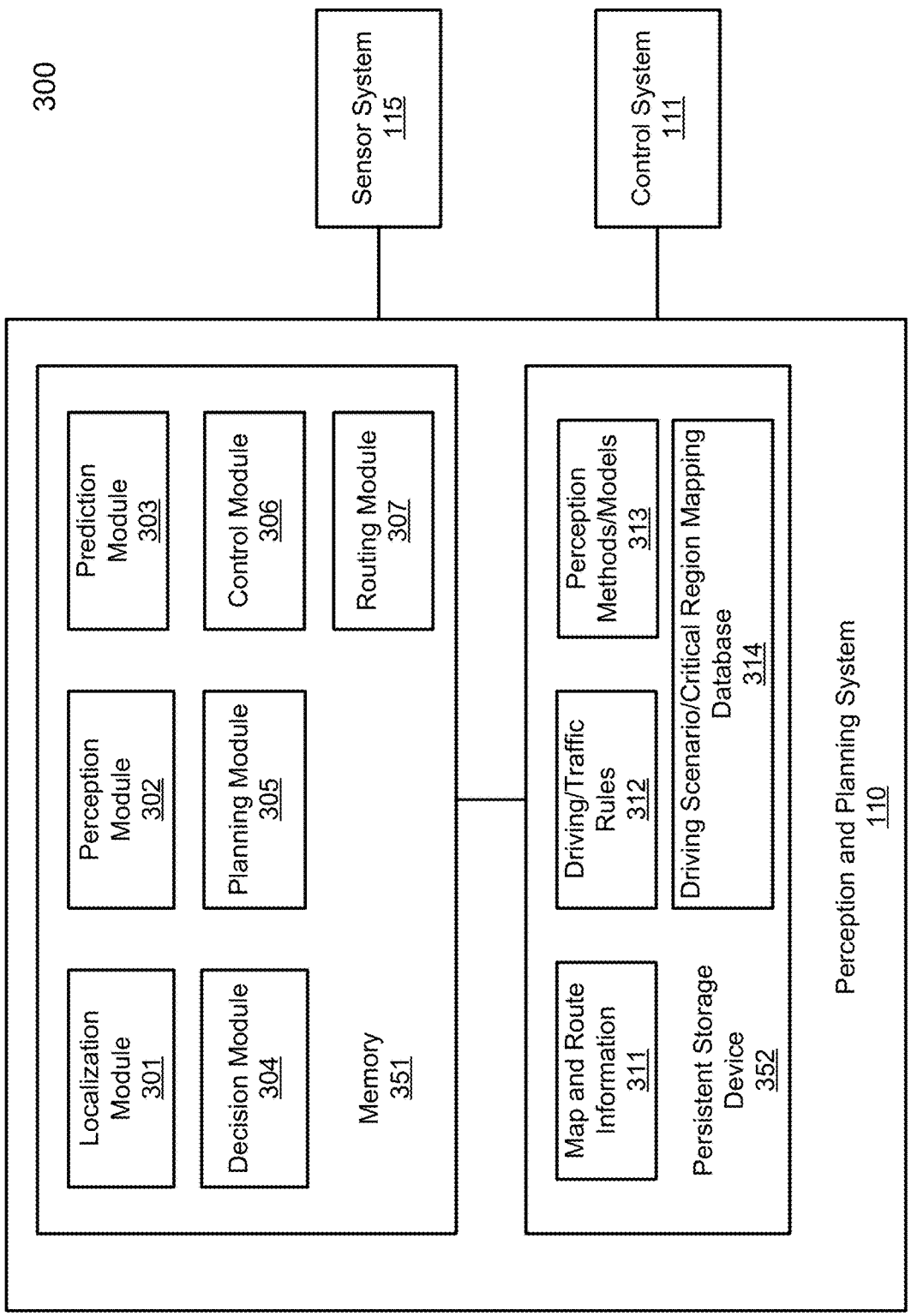
FIGS. 3A-3B are block diagrams illustrating an example of a perception and planning system used with an autonomous vehicle according to one embodiment.
Figure 3B:
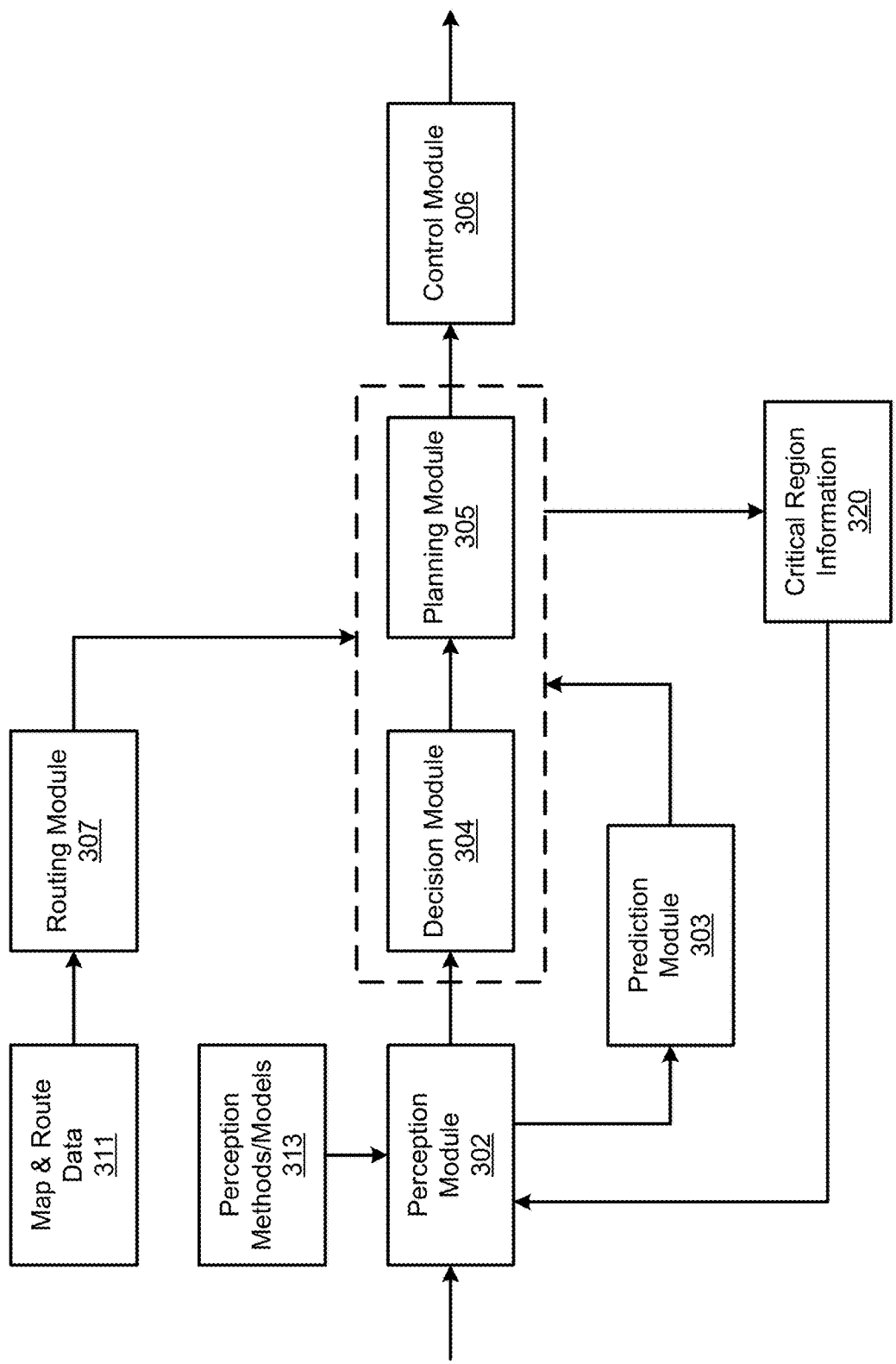

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle or driving cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, perception module 302 perceives the driving environment based on the sensor data and generates perception information using various perception methods or models 313. Some of the perception methods or models for processing the sensor data may involve more processing resources and longer time such as processing 3D LIDAR data to generate higher precision and resolution perception information, while other perception methods or models may involve less processing resources and shorter time to generate lower precision and resolution perception information. Given a limited time for a particular planning/driving cycle (e.g., 100-200 ms), most of the conventional autonomous driving systems choose to use a lower resolution perception method to satisfy the restricted planning time. However, higher resolution perception data will provide better visibility of driving environment for the planning module 305 to plan a better route or path and to avoid potential collision, but it also requires more processing resources and time.

In one embodiment, referring to FIGS. 3A and 3B, when planning a trajectory, planning module 305 is configured to determine a critical region surrounding an ADV, in addition to generating a trajectory for controlling the ADV for the current planning cycle. The information concerning the critical region 320 is then fed back to perception module 302. Based on the critical region, perception module 302 can select different perception methods or models 313 to process the critical region and areas other than the critical region (referred to as non-critical regions) for the next planning cycle. Specifically, for example, perception module 302 utilizes a higher precision and resolution perception method or model to generate perception information for the critical region, while utilizing a lower perception and resolution perception method or model to generate perception information for other areas.

Although it may take more processing resources and longer time to generate the higher precision and resolution perception for the critical region, it may justify for such an approach for the critical region for the safety purpose. For most of time, planning module 305 does not need high resolution perception information for the areas other than the critical region (e.g., farther area). Since a critical region is relatively smaller compared to the rest of the area, the additional processing resources and time can be limited to a manageable amount that still satisfies the planning cycle time requirement. For example, perception module 302 may utilize 3D LIDAR data to generate perception information for the critical region, while using 2D LIDAR data to generate perception information for the non-critical areas. Typically, the resources and time for processing 3D LIDAR data are higher than processing 2D LIDAR data. By providing the critical region information back to perception module 302, perception module 302 can operate in a hybrid mode using a combination of different perception methods/models 313 for processing different regions, while it still satisfies the limited time requirement of a planning cycle.

Figure 4:
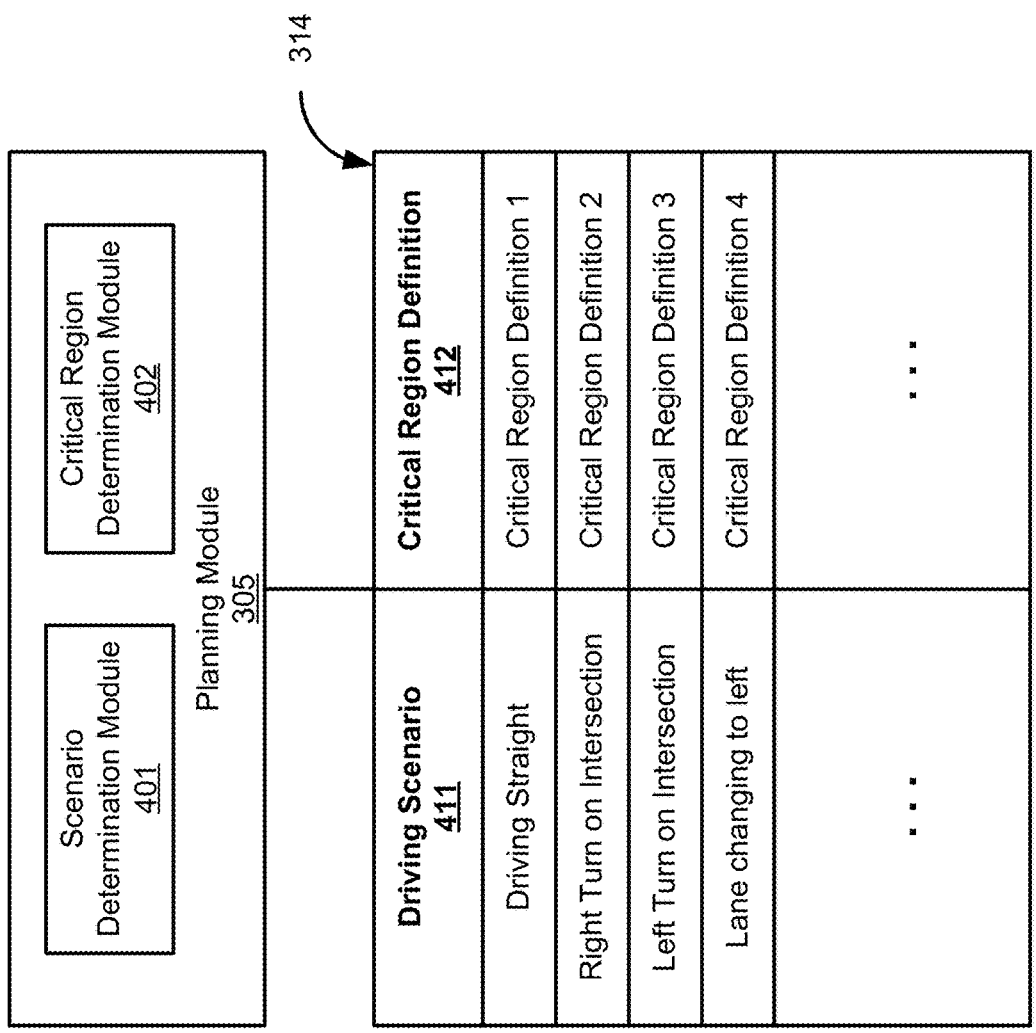
FIG. 4 is a block diagram illustrating an example of a planning module according to one embodiment.

FIG. 4 is a block diagram illustrating an example of a planning module according to one embodiment. Referring to FIG. 4, planning module 305 includes, amongst others, scenario determination module 401 and critical region redetermination module 402. According to one embodiment, in determining a critical region, scenario determination module 401 is configured to determine a driving scenario at the point in time based on the trajectory and the current location of the ADV. A driving scenario may be a scenario of driving straight, left or right turn, U-turn, or lane changing, etc. The driving scenario can be determined based on information of the trajectory generated by planning module 305, such as, for example, the curve of the trajectory and speed and heading direction of the ADV at different points in time on the trajectory.

Based on the driving scenario, critical region determination module 402 is configured to determine a critical region for that particular driving scenario. Different driving scenarios may be associated with different shapes or sizes of critical regions. In one embodiment, planning module 305 maintains a database storing critical region definition information for a variety of driving scenarios. Based on a particular driving scenario, a search can be issued to the database to search information defining a critical region for the given driving scenario. In one embodiment, such a database can be implemented as a part of driving scenario/critical region mapping table 314.

As shown in FIG. 4, the driving scenario/critical region mapping table 314 includes a number of mapping entries. Each mapping entry maps a driving scenario 411 to metadata or definition describing or defining a critical region corresponding to the driving scenario. In one embodiment, the metadata of a critical region may include a set of rules or an algorithm to determine or calculate a critical region based on the driving environment at the point in time. Since each driving environment (e.g., lane configuration and size, vehicle physical size and limitation, etc.) is different, at least the size of the critical region has to be determined dynamically, for example, based on the trajectory. In one embodiment, based on the driving scenario, critical region determination module 402 performs a lookup operation in driving scenario/critical region mapping table 314 to locate a mapping entry matching the driving scenario. The metadata of the 412 is then obtained from the matching entry. A critical region is then calculated using the critical region algorithm or method obtained from the metadata.

Figure 5B:
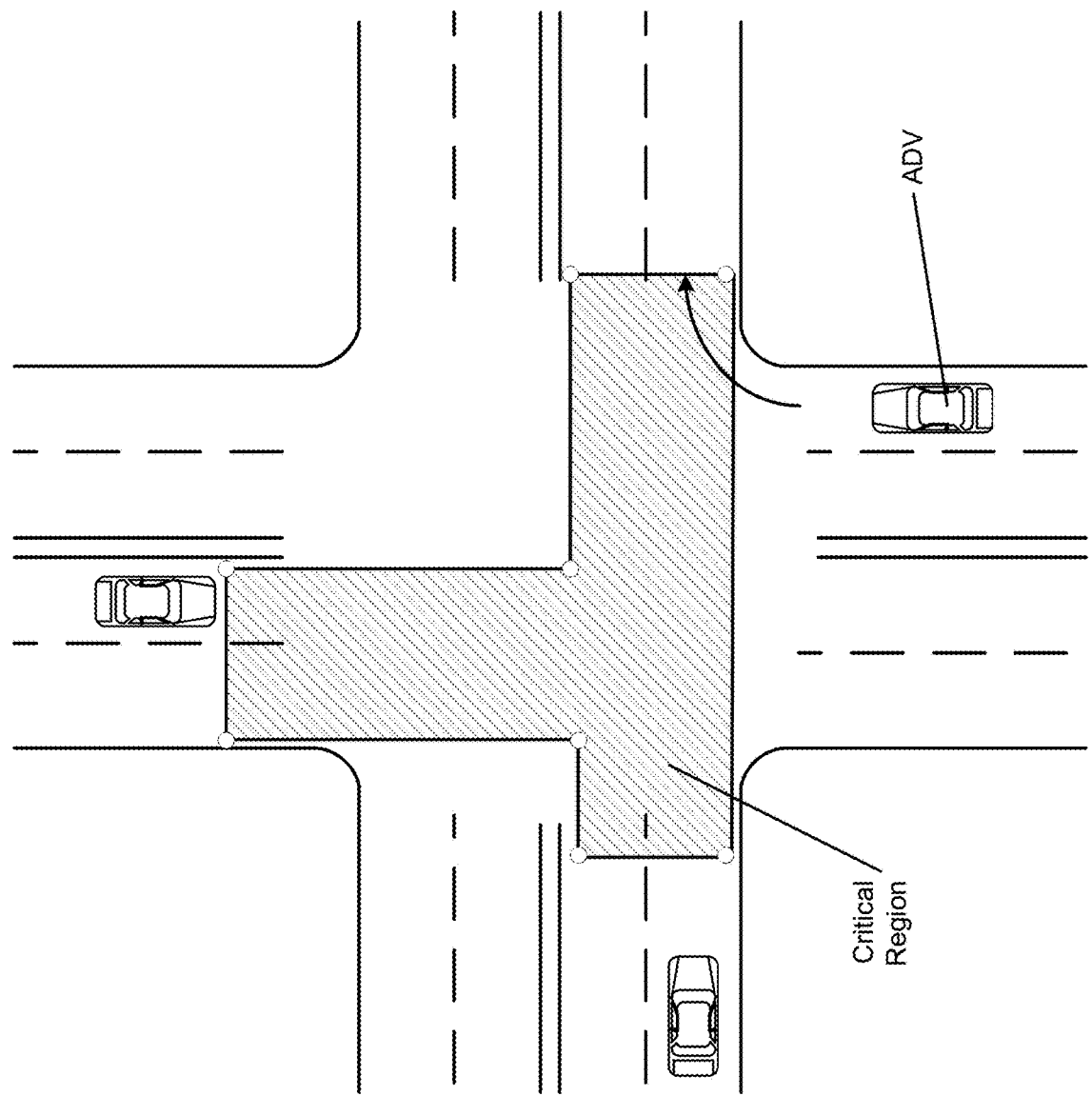
Figure 5C:
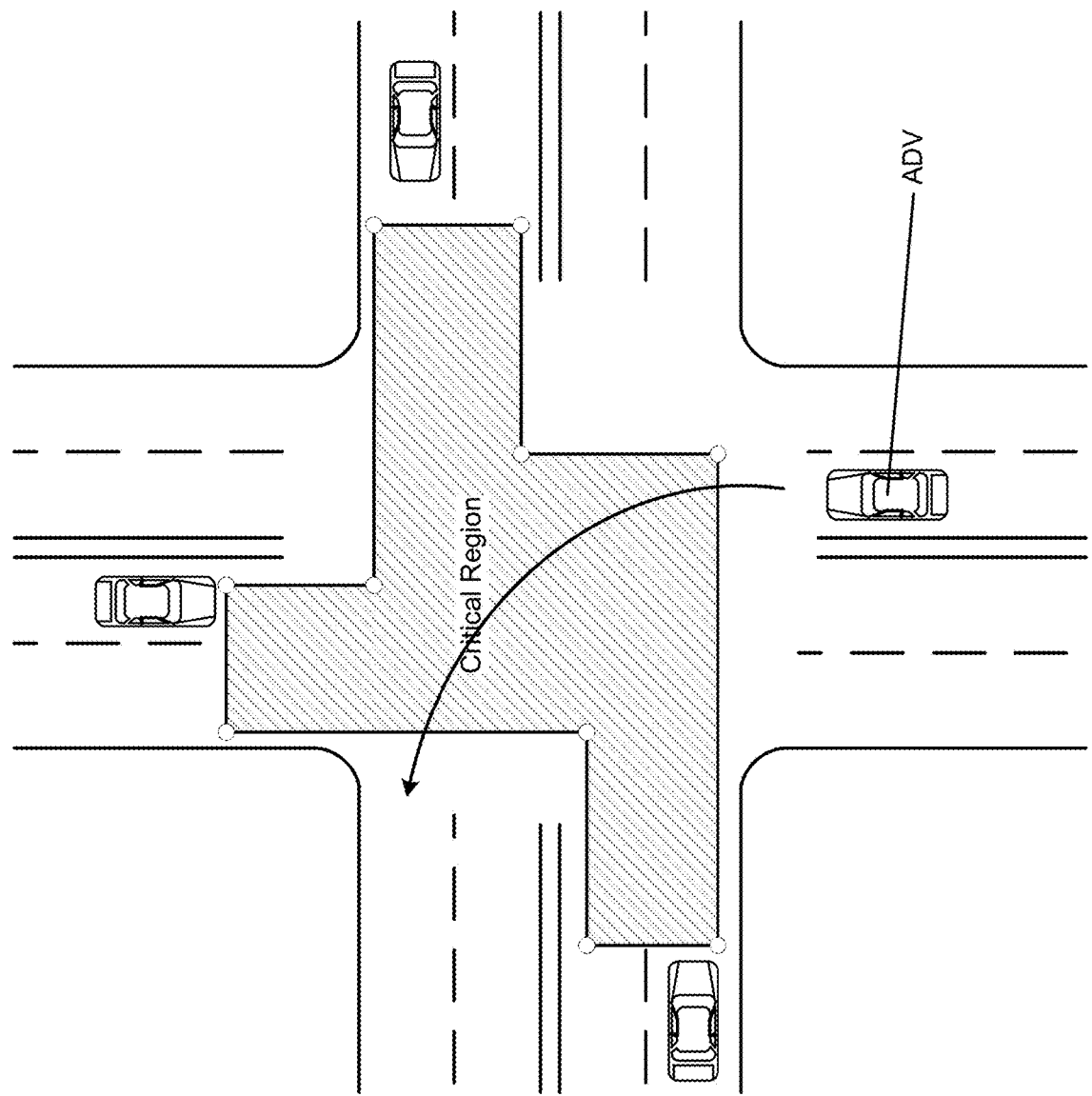

FIG. 5A shows an example of a critical region for a driving scenario of driving straight. In this example, the ADV is driving straight in the lane. Thus, the critical region in this scenario will include the area in front of the ADV as well as the left and right immediate areas of the adjacent lanes, because the traffic in these areas may potentially affect the driving of the ADV, vice versa. FIG. 5B shows an example of a critical region for a right turn driving scenario at an intersection. In this example, the ADV attempts to make a right turn, so the critical region will include the areas that the opposing traffic on the opposite direction as well as the cross direction from left to right. FIG. 5C shows an example of a critical region for a left turn or U-turn driving scenario at an intersection. In this example, the critical region includes the similar areas of FIG. 5B. In addition, the critical region includes an area affecting the cross traffic from right to left.

The information describing the critical region is then transmitted back to perception module 302 to allow perception module 302 to processing sensor data using different perception methods or models for the critical region and noncritical region. According to one embodiment, when transmitting the information concerning a critical region, a specific data structure is defined and utilized to store the critical region information.

FIG. 6 is a block diagram illustrating an example of a data structure for storing feedback information for perception according to one embodiment. Referring to FIG. 6, data structure 600 includes a number of data members 601-605. Header 601 stores a timestamp indicating the time the corresponding trajectory and critical region were determined. Path length 602 stores the length of the trajectory or path (e.g., in meters). Path time 603 stores the time the ADV will take to complete the trajectory (e.g., in seconds). Trajectory point array 604 includes an array of data entries to store the information of each of the trajectory points that constitute the trajectory. The trajectory point information of each trajectory point includes at least the coordinates of the trajectory points (x, y, z), a heading direction of the trajectory point (θ), and the time (t) the ADV will be at the trajectory point from the current location. Critical point array 605 includes an array of data entries to store coordinates (x, y) of points of a polygon in a form of vertexes defining a critical region. The critical points refer to the turning points of a polygon as shown in FIGS. 5A-5B (indicated as small circles of the turning corners).

Once the data structure is received by perception module 302, perception module 302 can parse the data structure to determine the critical region and the non-critical region based on the trajectory points 604 and critical region points 605. Perception module can then apply different perception methods or models on different sensor data (e.g., 3D vs. 3D LIDAR data) to generate the perception information of the critical region and the non-critical region for the next planning cycle. As a result, the quality of the perception information and the processing time and resources required to generate the perception information are optimized.

Figure 7:
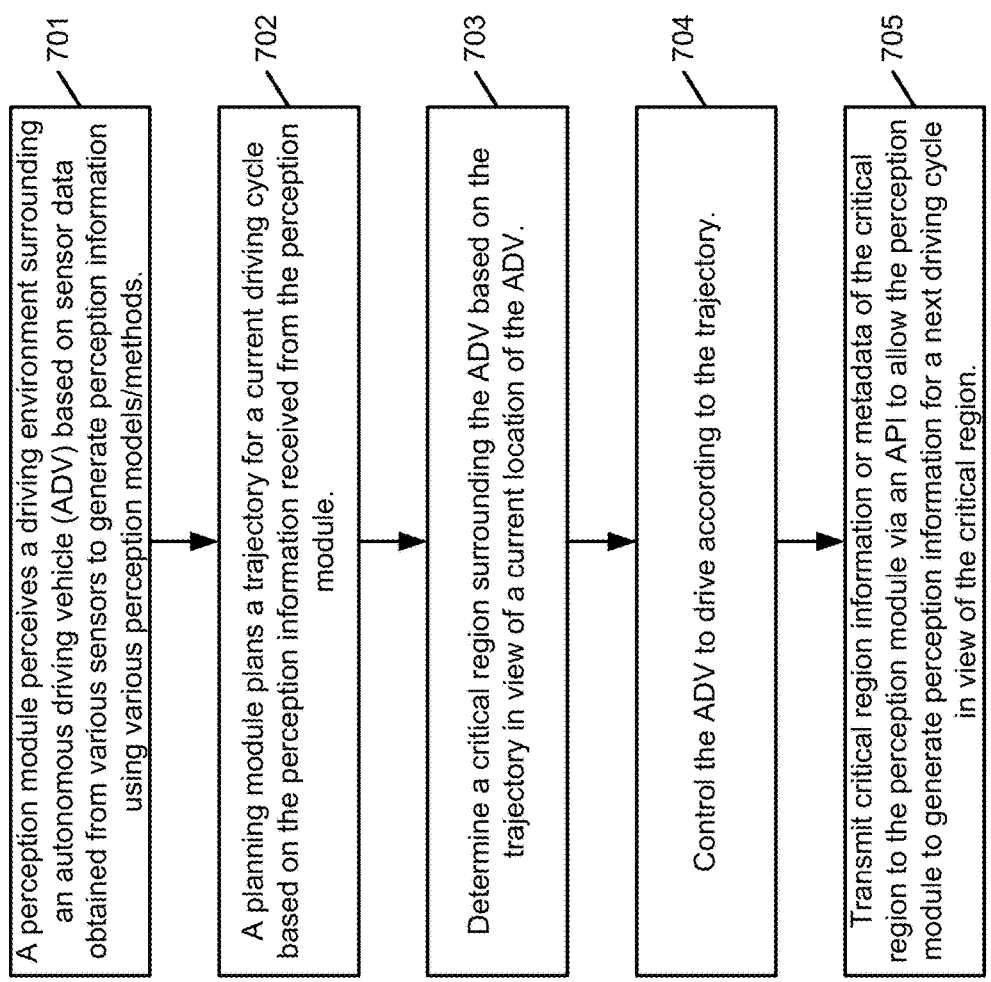
FIG. 7 is a flow diagram illustrating a process of operating an autonomous driving vehicle according to one embodiment.

FIG. 7 is a flow diagram illustrating an example of a process for operating an autonomous driving vehicle according to one embodiment of the invention. Process 700 may be performed by processing logic which may include software, hardware, or a combination thereof. For example, process 700 may be performed by perception module 302 and/or planning module 305. Referring to FIG. 7, in operation 701, perception module perceives a driving environment surrounding an ADV based on sensor data obtained from a variety of sensors (e.g., LIDAR, RADAR, cameras). Perception information is generated using various perception methods and models. In operation 702, the planning module plans a trajectory representing a path or route for a current planning cycle based on the perception information received from the perception module. In operation 703, a critical region surrounding the ADV is determined based on the trajectory in view of the current location of the ADV. In operation 704, the ADV is then controlled and driven according to the trajectory. In addition, in operation 705, the information concerning the critical region is then transmitted to the perception module to allow the perception region to generate perception information for the next planning cycle using different perception methods or models in view of the critical region and the non-critical region.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
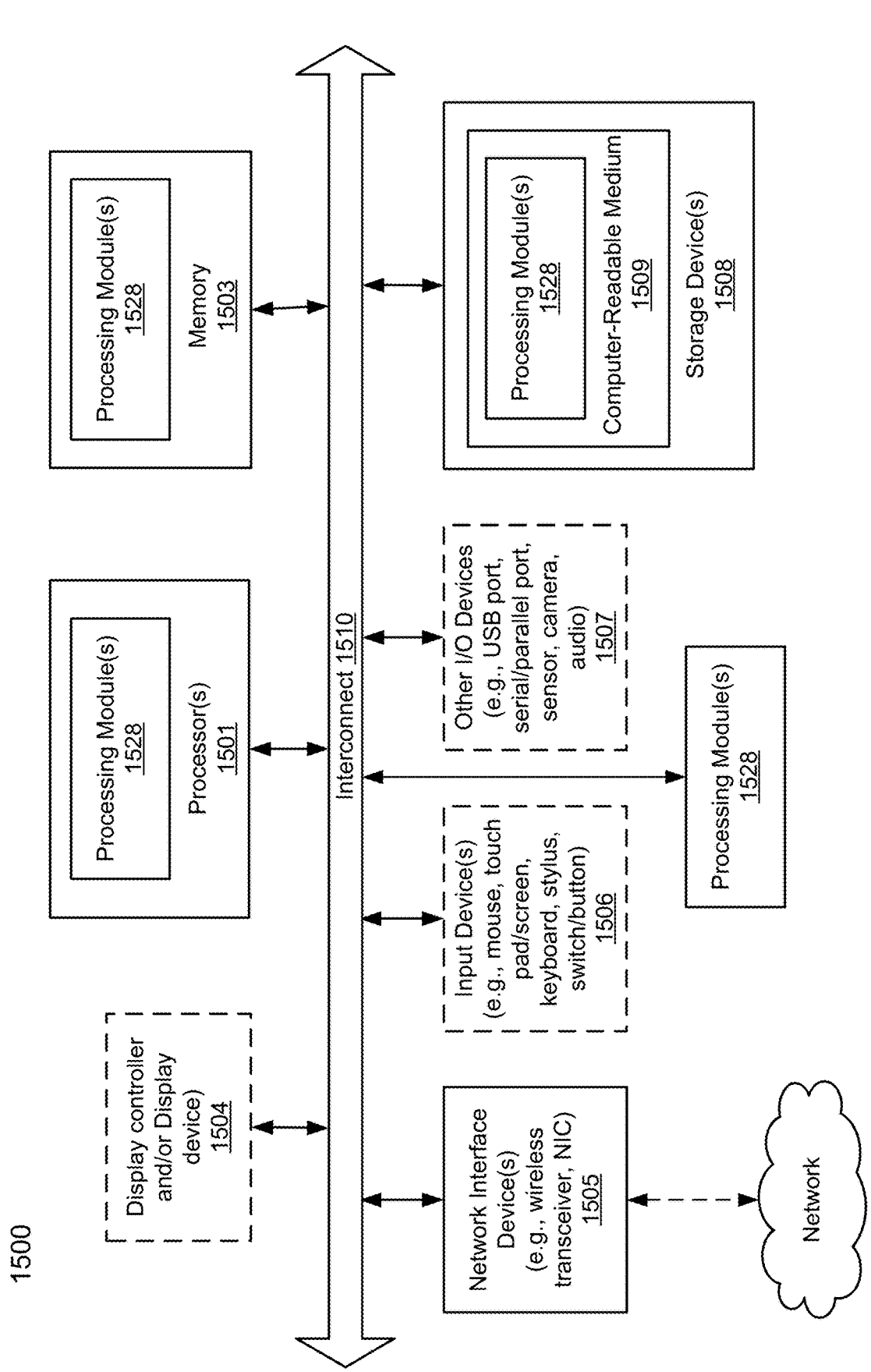
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, etc. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, comprising:
    perceiving, by a perception module, a driving environment surrounding an autonomous driving vehicle (ADV) based on sensor data obtained from a plurality of sensors, generating perception information for a current driving cycle using a plurality of perception models;
    planning, by a planning module, a trajectory for the current driving cycle based on the perception information for the current driving cycle received from the perception module;
    determining a critical region surrounding the ADV based on the trajectory in view of a current location of the ADV, including
        determining a driving scenario associated with the ADV based on the trajectory and the current location of the ADV, wherein the driving scenario is determined based on a curvature of the trajectory, a speed and a heading direction of the ADV at different points in time on the trajectory,
        performing a lookup operation in a database based on the driving scenario to obtain metadata describing the critical region corresponding to the driving scenario, wherein the lookup operation includes locating a mapping entry matching the driving scenario including driving straight scenario, right turn on intersection scenario, left turn on intersection scenario, lane changing to left scenario, and wherein the driving straight scenario corresponds to a first critical region, the right turn on intersection scenario corresponds to a second critical region, the left turn on intersection scenario corresponds to a third critical region, and the lane changing to left scenario corresponds to a fourth critical region,
        determining a polygon defining the critical region surrounding the ADV based on the metadata describing the critical region,
        calculating vertexes of the polygon based on a shape of the polygon, wherein the vertexes of the polygon are used to determine a dimension and location of the critical region, and
        in response to determining the driving scenario associated with the ADV based on the trajectory and the current location of the ADV, constructing the critical region based on the driving scenario;
    controlling the ADV to drive according to the trajectory; and
    transmitting metadata describing the critical region to the perception module via an application programming interface (API) such that the perception module generates, within a time limit requirement of a single driving cycle, perception information for a next driving cycle in view of the critical region of the ADV, wherein generating the perception information for the next driving cycle comprises generating first perception information perceiving the critical region using a first perception model of the perception models based on three-dimension sensor data; and
    generating second perception information perceiving a remaining area other than the critical region using a second perception model of the perception model based on two-dimension sensor data, wherein the first perception information perceiving the critical region describes the driving environment in a higher resolution than the second perception information perceiving the remaining area other than the critical region, and wherein the perception module consumes more processing resources to generate the first perception information than the second perception information.

2. The method of claim 1, wherein the critical region surrounding the ADV includes one or more areas that the ADV may interfere with other traffic in the next driving cycle.

3. The method of claim 1, further comprising constructing the critical region in view of the current location of the ADV based on the metadata describing the critical region of the driving scenario.

4. The method of claim 1, wherein the database comprises a plurality of database entries, wherein each database entry of the plurality of database entries maps a particular driving scenario to a set of metadata describing one or more rules to define a polygon representing the critical region.

5. The method of claim 1, further comprising:
    determining one of a plurality of the perception models based on the critical region and the remaining area other than the critical region for the next driving cycle.

6. The method of claim 5, wherein the plurality of the perception models include the first perception model, the second perception model, and a third perception model, wherein the third perception model is a hybrid mode using a combination of different perception models.

7. The method of claim 1, wherein the metadata of the critical region includes a set of rules to determine the critical region based on the driving environment at a point in time.

8. The method of claim 7, wherein the driving environment includes a lane configuration and size.

9. The method of claim 7, wherein the driving environment includes a vehicle physical size.

10. A non-transitory machine-readable medium having instructions stored therein, which when executed by a processor, cause the processor to perform operations, the operations comprising:
   perceiving, by a perception module, a driving environment surrounding an autonomous driving vehicle (ADV) based on sensor data obtained from a plurality of sensors, generating perception information for a current driving cycle using a plurality of perception models;
   planning, by a planning module, a trajectory for the current driving cycle based on the perception information for the current driving cycle received from the perception module;
   determining a critical region surrounding the ADV based on the trajectory in view of a current location of the ADV, including
      determining a driving scenario associated with the ADV based on the trajectory and the current location of the ADV, wherein the driving scenario is determined based on a curvature of the trajectory, a speed and a heading direction of the ADV at different points in time on the trajectory,
      performing a lookup operation in a database based on the driving scenario to obtain metadata describing the critical region corresponding to the driving scenario, wherein the lookup operation includes locating a mapping entry matching the driving scenario including driving straight scenario, right turn on intersection scenario, left turn on intersection scenario, lane changing to left scenario, and wherein the driving straight scenario corresponds to a first critical region, the right turn on intersection scenario corresponds to a second critical region, the left turn on intersection scenario corresponds to a third critical region, and the lane changing to left scenario corresponds to a fourth critical region,
      determining a polygon defining the critical region surrounding the ADV based on the metadata describing the critical region,
      calculating vertexes of the polygon based on a shape of the polygon, wherein the vertexes of the polygon are used to determine a dimension and location of the critical region, and
      in response to determining the driving scenario associated with the ADV based on the trajectory and the current location of the ADV, constructing the critical region based on the driving scenario;
   controlling the ADV to drive according to the trajectory; and
   transmitting metadata describing the critical region to the perception module via an application programming interface (API) such that the perception module generates, within a time limit requirement of a single driving cycle, perception information for a next driving cycle in view of the critical region of the ADV, wherein generating the perception information for the next driving cycle comprises generating first perception information perceiving the critical region using a first perception model of the perception models based on three-dimension sensor data; and
   generating second perception information perceiving a remaining area other than the critical region using a second perception model of the perception model based on two-dimension sensor data, wherein the first perception information perceiving the critical region describes the driving environment in a higher resolution than the second perception information perceiving the remaining area other than the critical region, and wherein the perception module consumes more processing resources to generate the first perception information than the second perception information.

11. The machine-readable medium of claim 10, wherein the critical region surrounding the ADV includes one or more areas that the ADV may interfere with other traffic in the next driving cycle.

12. The machine-readable medium of claim 10, wherein the operations further comprise constructing the critical region in view of the current location of the ADV based on the metadata describing the critical region of the driving scenario.

13. The machine-readable medium of claim 10, wherein the database comprises a plurality of database entries, wherein each database entry of the plurality of database entries maps a particular driving scenario to a set of metadata describing one or more rules to define a polygon representing the critical region.

14. The machine-readable medium of claim 10, wherein the operations further comprise:
   determining one of a plurality of the perception models based on the critical region and the remaining area other than the critical region for the next driving cycle.

15. The machine-readable medium of claim 14, wherein the plurality of the perception models include the first perception model, the second perception model, and a third perception model, wherein the third perception model is a hybrid mode using a combination of different perception models.

16. A data processing system, comprising:
   a processor;
   a memory coupled to the processor; and
   a perception module and a planning module loaded in the memory and executed by the processor to perform operations, the operations including
      perceiving, by the perception module, a driving environment surrounding an autonomous driving vehicle (ADV) based on sensor data obtained from a plurality of sensors, generating perception information for a current driving cycle using a plurality of perception models,
      planning, by the planning module, a trajectory for the current driving cycle based on the perception information for the current driving cycle received from the perception module,
      determining a critical region surrounding the ADV based on the trajectory in view of a current location of the ADV, including
         determining a driving scenario associated with the ADV based on the trajectory and the current location of the ADV, wherein the driving scenario is determined based on a curvature of the trajectory, a speed and a heading direction of the ADV at different points in time on the trajectory,
         performing a lookup operation in a database based on the driving scenario to obtain metadata describing the critical region corresponding to the driving scenario, wherein the lookup operation includes locating a mapping entry matching the driving scenario including driving straight scenario, right turn on intersection scenario, left turn on intersection scenario, lane changing to left scenario, and wherein the driving straight scenario corresponds to a first critical region, the right turn on intersection scenario corresponds to a second critical region, the left turn on intersection scenario corresponds to a third critical region, and the lane changing to left scenario corresponds to a fourth critical region, determining a polygon defining the critical region surrounding the ADV based on the metadata describing the critical region, calculating vertexes of the polygon based on a shape of the polygon, wherein the vertexes of the polygon are used to determine a dimension and location of the critical region, and in response to determining the driving scenario associated with the ADV based on the trajectory and the current location of the ADV, constructing the critical region based on the driving scenario, controlling the ADV to drive according to the trajectory; and transmitting metadata describing the critical region to the perception module via an application programming interface (API) such that the perception module generates, within a time limit requirement of a single driving cycle, perception information for a next driving cycle in view of the critical region of the ADV, wherein generating the perception information for the next driving cycle comprises generating first perception information perceiving the critical region using a first perception model of the perception models based on three-dimension sensor data; and generating second perception information perceiving a remaining area other than the critical region using a second perception model of the perception model based on two-dimension sensor data, wherein the first perception information perceiving the critical region describes the driving environment in a higher resolution than the second perception information perceiving the remaining area other than the critical region, and wherein the perception module consumes more processing resources to generate the first perception information than the second perception information.

17. The system of claim 16, wherein the critical region surrounding the ADV includes one or more areas that the ADV may interfere with other traffic in the next driving cycle.

18. The system of claim 16, wherein the operations further comprise:

determining one of a plurality of the perception models based on the critical region and the remaining area other than the critical region for the next driving cycle.

19. The system of claim 18, wherein the plurality of the perception models include the first perception model, the second perception model, and a third perception model, wherein the third perception model is a hybrid mode using a combination of different perception models.

* * * * *